(12) United States Patent
Drake et al.

(10) Patent No.: US 9,127,138 B2
(45) Date of Patent: Sep. 8, 2015

(54) ANTI-EXTRUSION COMPOSITIONS FOR SEALING AND WEAR COMPONENTS

(71) Applicant: Delsper LP, Kulpsville, PA (US)

(72) Inventors: Kerry A. Drake, Red Hill, PA (US); Charles P. Burke, Humble, TX (US); Ronald R. Campbell, Harleysville, PA (US); William F. Burgoyne, Bethlehem, PA (US); Burak Bekisli, Hellertown, PA (US)

(73) Assignee: Delsper LP, Kulpsville, PA (US)

( * ) Notice: Subject to any disclaimer, the term of this patent is extended or adjusted under 35 U.S.C. 154(b) by 0 days.

(21) Appl. No.: 14/165,497

(22) Filed: Jan. 27, 2014

(65) Prior Publication Data

US 2014/0213742 A1     Jul. 31, 2014

Related U.S. Application Data

(60) Provisional application No. 61/757,697, filed on Jan. 28, 2013.

(51) Int. Cl.
| | |
|---|---|
| *C08G 8/28* | (2006.01) |
| *C08K 5/053* | (2006.01) |
| *C09K 3/10* | (2006.01) |
| *C08L 65/02* | (2006.01) |
| *C08L 71/12* | (2006.01) |

(Continued)

(52) U.S. Cl.
CPC ............... *C08K 5/053* (2013.01); *C08L 65/02* (2013.01); *C08L 71/12* (2013.01); *C08L 75/02* (2013.01); *C08L 75/04* (2013.01); *C08L 77/10* (2013.01); *C08L 79/04* (2013.01); *C08L 79/08* (2013.01); *C08L 81/06* (2013.01); *C09K 3/1006* (2013.01); *C08G 61/127* (2013.01); *C08G 73/14* (2013.01); *C08G 73/18* (2013.01); *C08G 2261/135* (2013.01); *C08G 2261/312* (2013.01); *C08G 2261/3142* (2013.01); *C08G 2261/3442* (2013.01); *C08G 2261/76* (2013.01); *C08L 65/00* (2013.01)

(58) Field of Classification Search
None
See application file for complete search history.

(56) References Cited

U.S. PATENT DOCUMENTS

| | | | |
|---|---|---|---|
| 3,092,191 A | 6/1963 | Austin et al. | |
| 3,512,592 A | 5/1970 | Kellner | |

(Continued)

FOREIGN PATENT DOCUMENTS

| | | |
|---|---|---|
| EP | 251357 B1 | 1/1988 |
| GB | 2185114 | 7/1987 |

(Continued)

OTHER PUBLICATIONS

Thompson et al. "A Novel Method for Crosslinking Polyetheretherketone" Journal of Applied Polymer Science, vol. 36, 1988, 1113-1120.*

(Continued)

*Primary Examiner* — Robert S Loewe
(74) *Attorney, Agent, or Firm* — Flaster/Greenberg P.C.

(57) ABSTRACT

A method and compositions are described which improve extrusion- and creep-resistance of components for use in a high temperature applications including sealing elements and seal connectors among others. The method includes providing a composition having an aromatic polymer and a crosslinking compound, and subjecting the composition to a heat molding process to form the component and crosslink the aromatic polymer.

23 Claims, 10 Drawing Sheets

(51) Int. Cl.

| | |
|---|---|
| *C08L 75/02* | (2006.01) |
| *C08L 75/04* | (2006.01) |
| *C08L 77/10* | (2006.01) |
| *C08L 79/04* | (2006.01) |
| *C08L 79/08* | (2006.01) |
| *C08L 81/06* | (2006.01) |
| *C08G 73/14* | (2006.01) |
| *C08G 73/18* | (2006.01) |
| *C08G 61/12* | (2006.01) |
| *C08L 65/00* | (2006.01) |

(56) References Cited

U.S. PATENT DOCUMENTS

| | | | |
|---|---|---|---|
| 3,533,997 | A * | 10/1970 | Angelo .................. 525/436 |
| 4,609,714 | A | 9/1986 | Harris et al. |
| 4,708,994 | A | 11/1987 | Wong |
| 4,710,948 | A | 12/1987 | Withjack |
| 4,731,442 | A | 3/1988 | Lindley et al. |
| 4,827,761 | A | 5/1989 | Vinegar et al. |
| 4,861,810 | A | 8/1989 | Dewhirst |
| 5,108,840 | A | 4/1992 | Mercer |
| 5,114,780 | A | 5/1992 | Mercer et al. |
| 5,134,207 | A | 7/1992 | McGrath et al. |
| 5,145,936 | A | 9/1992 | Mercer |
| 5,155,175 | A * | 10/1992 | Mercer et al. .......... 525/390 |
| 5,173,542 | A | 12/1992 | Lau et al. |
| 5,179,188 | A | 1/1993 | Mercer et al. |
| 5,204,416 | A | 4/1993 | Mercer et al. |
| 5,235,044 | A | 8/1993 | Mercer et al. |
| 5,270,453 | A | 12/1993 | Lau et al. |
| 5,658,994 | A | 8/1997 | Burgoyne, Jr. et al. |
| 5,668,245 | A | 9/1997 | Marrocco, III et al. |
| 5,886,130 | A | 3/1999 | Trimmer et al. |
| 6,060,170 | A | 5/2000 | Burgoyne, Jr. |
| 6,184,284 | B1 | 2/2001 | Stokich, Jr. et al. |
| 6,339,966 | B1 | 1/2002 | Kalidindi |
| 6,582,251 | B1 | 6/2003 | Burke et al. |
| 6,716,955 | B2 | 4/2004 | Burgoyne, Jr. |
| 6,855,774 | B2 | 2/2005 | Kawasaki et al. |
| 6,878,778 | B1 | 4/2005 | Kawasaki et al. |
| 6,914,119 | B2 | 7/2005 | Yoshida et al. |
| 7,001,678 | B2 | 2/2006 | Casasabta, III et al. |
| 7,087,701 | B2 | 8/2006 | Londergan |
| 7,101,957 | B2 | 9/2006 | Huang et al. |
| 7,109,249 | B2 | 9/2006 | Bruza et al. |
| 7,115,531 | B2 | 10/2006 | Schaffer, II et al. |
| 7,189,795 | B2 | 3/2007 | Burgyyne, Jr. et al. |
| 7,196,155 | B2 | 3/2007 | Chen et al. |
| 7,249,971 | B2 | 7/2007 | Burke et al. |
| 7,307,137 | B2 | 12/2007 | Lau et al. |
| 7,589,228 | B2 | 9/2009 | Nishichi et al. |
| 7,696,275 | B2 | 4/2010 | Slay et al. |
| 7,919,825 | B2 | 4/2011 | Kretz et al. |
| 8,096,353 | B2 | 1/2012 | Ver Meer |
| 8,367,776 | B2 | 2/2013 | Noguchi et al. |
| 8,502,401 | B2 | 8/2013 | Burgoyne, Jr. et al. |
| 2002/0195739 | A1 | 12/2002 | Bagley et al. |
| 2003/0032339 | A1 | 2/2003 | Bell et al. |
| 2005/0161212 | A1 | 7/2005 | Leismer et al. |
| 2006/0199910 | A1 | 9/2006 | Walton et al. |
| 2007/0142547 | A1 | 6/2007 | Vaidya et al. |
| 2007/0296101 | A1 | 12/2007 | DiPietro et al. |
| 2010/0022718 | A1 * | 1/2010 | Tu et al. .................. 525/471 |
| 2010/0081007 | A1 | 4/2010 | Zheng et al. |
| 2010/0126266 | A1 | 5/2010 | Coenen |
| 2011/0139466 | A1 | 6/2011 | Chen et al. |
| 2011/0260343 | A1 | 10/2011 | Burgoyne, Jr. et al. |
| 2012/0077935 | A1 | 3/2012 | Gurevich et al. |
| 2012/0097194 | A1 | 4/2012 | Mcdaniel et al. |
| 2012/0100379 | A1 | 4/2012 | Luo et al. |
| 2012/0130041 | A1 * | 5/2012 | Han et al. ............... 528/125 |
| 2012/0252218 | A1 | 10/2012 | Kori et al. |
| 2013/0012635 | A1 | 1/2013 | Ren et al. |
| 2013/0130529 | A1 * | 5/2013 | Ayers ..................... 439/271 |
| 2014/0213742 | A1 | 7/2014 | Drake et al. |
| 2014/0316079 | A1 | 10/2014 | Drake et al. |

FOREIGN PATENT DOCUMENTS

| | | |
|---|---|---|
| WO | WO 0061667 A1 | 10/2000 |
| WO | WO 01/16232 A1 | 3/2001 |
| WO | WO 2009021999 A | 2/2009 |
| WO | WO 2010/019488 A1 | 2/2010 |
| WO | WO 2011071619 A2 | 6/2011 |
| WO | WO 2013074120 A1 | 5/2013 |

OTHER PUBLICATIONS

Yurchenko et al. "Synthesis, mechanical properties and chemical/solvent resistance of crosslinked poly(aryl-ether-ether-ketones) at high temperatures" Polymer, 2010, doi:10.1016/j.polymer.2010.01.056.*

Ladacki et al, "Studies of the Variations in Bond Dissociation Energies of Aromatic Compounds. I. Mono-bromo-aryles," Proc. R. Soc. Lond. a, r 219, pp. 341-253 (1953).

C.-M. Chan et al., "Crosslinking of Poly( arylene ether ketones). II. Crystallization Kinetics," J. of Polymer Science: Part B: Polymer Physics, vol. 25, pp. 1655-1665 (1987).

Hendrick, "Elastomeric behavior of Crosslinked poly(aryl ether ketone)s at elevated temperatures," Polymer, vol. 22, No. 23, pp. 5094-5097, (1992). Butterworth-Heinimann Ltd.

Yi-Chi Chien et al, "Fate of Bromine in Pyrolysis of Printed Circuit Board Wastes," ChemoSphere, vol. 40, pp. 383-387 (2000).

Burke et al., "High Pressure/High Temperature Technology and Introduction of LHT a New High Temperature Plastic," MERL, 26 pages (Sep. 2010).

Drake, "High Temperature Hybrid Elastomers," PhD Thesis, (2011).

International Search Report and Written Opinion for PCT/US13/65977, mailed Apr. 17, 2014—15 pages.

International Search Report and Written Opinion for PCT/US14/13246, mailed Apr. 30, 2014—16 pages.

International Search Report and Written Opinion for PCT/US14/30666, mailed Aug. 13, 2014—19 pages.

Written Opinion for PCT/US14/30666, mailed Jan. 30, 2015—3 pages.

* cited by examiner

ANTI-EXTRUSION COMPOSITIONS FOR SEALING AND WEAR COMPONENTS

CROSS-REFERENCE TO RELATED APPLICATIONS

This application claims the benefit under 35 U.S.C. §119 (e) to U.S. Provisional Patent Application No. 61/757,697, filed Jan. 28, 2013, entitled, "Anti-Extrusion Compositions for Sealing and Wear Components," the disclosure of which is incorporated herein in its entirety.

BACKGROUND OF THE INVENTION

1. Field of the Invention

The invention relates to the field of high temperature polymers and their use in sealing and other wear-resistant components.

2. Description of Related Art

Sealing components and other wear resistant materials can be used in very rigorous and demanding environments. Their wear and mechanical properties are very critical to their applicability and useful life. For example, sealing components are typically formed of elastomeric materials that are situated in a gland. In one application, an annular seal may fit within a gland and be installed to seal a gap between surfaces, e.g., a seal may be installed around a shaft that fits within a bore and the bore can be configured to have a gland for receiving the seal. In many instances, the seal is not installed alone and is part of a seal assembly. Such assemblies may include back-up rings and other components. Seals and seal assemblies are usually constructed to support the primary sealing element, generally formed of an elastomeric material, to prevent extrusion of that material into the gland and into the space or gap between the sealing surfaces.

When temperatures of use become high, pure elastomeric seals may not be able to provide sufficient sealing force to prevent leakage and/or may extrude into the gap between sealing surfaces, e.g., a shaft and a seal. Under such conditions, thermoplastic materials with higher shear strengths may be used to isolate the soft elastomer component from the gap between the sealing surfaces to assist in resisting extrusion. Combination of harder and softer materials are sometimes also used so that softer materials (such as, for example, polytetrafluoroethylene (PTFE) or other fluoropolymeric materials) are prevented from extruding into the gap by stiffer thermoplastic antiextrusion components. Such materials are used in unidirectional and bidirectional sealing assemblies.

Materials that have been used as antiextrusion components include polyetherether ketone (PEEK) and similar polyketones. Continuous use temperatures for such materials range from about 240° C. to about 260° C., including for commercial polyarylketones, such as Victrex® polyarylenes.

In use, at elevated temperatures, polyketones are well above their glass transition temperatures ($T_g$). For example, PEEK is semicrystalline and has a $T_g$ of 143° C. Other polyketones such as Victrex® PEK and PEKEKK have respective glass transition temperatures of 152° C. and 162° C.

As semicrystalline materials are used above their glass transition temperatures, they tend to demonstrate lower mechanical properties in service and there is a corresponding drop in performance. With reference to FIGS. 1 and 2, this effect can be seen as PEEK rings are loaded below and above their glass transition temperatures, respectively, and significant differences in extrusion resistance can be seen. FIG. 2 shows a 60% increase in extrusion at a pressure that is 50% lower for the same loading period.

Such extrusion issues are also problematic in the area of electrical connectors. Such connectors are used to relay electrical signals from sensors to electronics in downhole oil exploration tools. They function also as bulkhead seals and are the last line of defense against destruction of electronics in an oil exploration tool when the tool suffers a catastrophic failure. Such seals must be able to withstand high pressure for extended periods of time at elevated temperature. Unfortunately, many downhole oilfield products are used at or above the $T_g$ of various commercial polyketones, so that severe extrusion can take place. Often such extrusion results in failure of the part as a seal, allowing either moisture to leak through the seal or for the part to deform so it no longer performs properly mechanically. An example of this behavior can be seen in FIG. 3, which demonstrates extrusion on an electrical connector.

Attempts to enhance the properties of PEEK have been attempted. Cross-linking has been widely recognized as one way to modify high temperature polymeric materials. Several inventions have been aimed at improving the high temperature performance of organic polymers by using cross-linking within the polymers by cross-linking to itself, grafting cross-linking compounds to the polymer, or by incorporating cross-linking compounds into the polymer such as by blending.

U.S. Pat. No. 5,173,542 discloses use of bistriazene compounds for cross-linking polyimides, polyarylene ketones, polyarylether sulfones, polyquinolines, polyquinoxalines, and non-aromatic fluoropolymers. The resulting cross-linked polymers are useful as interlayer insulators in multilayer integrated circuits. The patent discusses difficulties in the art encountered includes controlling the cross-linking process in aromatic polymers to enhance properties. It proposes a bistriazene cross-linking structure and method to enhance chemical resistance and reduce crazing so that useful interlayer materials may be formed.

Other attempts to cross-link polymers to enhance high temperature properties have encountered difficulty with respect to thermal stability of the polymer. Other issues arise in terms of control of the rate and extent of cross-linking.

U.S. Pat. No. 5,874,516, which is assigned to the Applicant of the present application and is incorporated herein by reference in relevant part, shows polyarylene ether polymers that are thermally stable, have low dielectric constants, low moisture absorption and low moisture outgassing. The polymers further have a structure that may cross-link to itself or can be cross-linked using a cross-linking agent.

U.S. Pat. No. 6,060,170, which is assigned to the Applicant of the present application and is incorporated herein by reference in relevant part, describes the use of polyarylene ether polymer compositions having aromatic groups grafted on the polyarylene ether polymer backbone. The grafts allow for crosslinking of the polymers in a temperature range of about 200° C. to about 450° C. This patent discloses dissolving the polymer in an appropriate solvent for grafting the cross-linking group(s). Such required process steps can sometimes make grafting difficult or not practical in certain types of polymers or in certain polymeric structures, including, e.g., PEEK.

A further patent, U.S. Pat. No. 5,658,994 discusses a polyarylene ether polymer in which the polymer may be crosslinked, e.g., by crosslinking itself through exposure to temperatures of greater than about 350° C. or by use of a crosslinking agent. The patent also describes end-capping the polymer using known end-capping agents, such as phenyl-ethynyl, benzocyclobutene, ethynyl, and nitrile. Limited crosslinking is present at the end of the chain such that relevant properties, i.e., the glass transition temperature, the chemical resistance and the mechanical properties, are not enhanced sufficiently for all high temperature applications, Further developments in improving polyarylene ether polymer properties are described in International Patent Publication No. WO 2010/019488, which describes use of per (phenylethynyl)arenes as additives for polyarylene ethers, polyimides, polyureas, polyurethanes and polysulfones. The application discusses formation of a semi-interpenetrating polymer network between two polymers to improve properties.

Previous attempts have also been made to control where crosslinks form along high glass transition polymers to garner desired mechanical properties and prepare useful high temperature polymers. U.S. Pat. No. 5,658,994, noted above, and incorporated herein by reference in relevant part, demonstrates the use of a polyarylene ether in low dielectric interlayers which may be cross-linked, in one instance, by cross-linking the polymer to itself, through exposure to temperatures of greater than about 350° C. or alternatively by using a crosslinking agent. In that patent, as well as in U.S. Pat. No. 5,874,516, cross-linking occurs at the ends of the polymer backbone using known end capping agents, such as phenylethynyl, benzocyclobutene, ethynyl and nitrile. There is still a need to control the rate and extent of cross-linking and the location of crosslinks.

Co-pending International Application No. PCT/US2011/061413 describes a composition having a crosslinking compound of the structure:

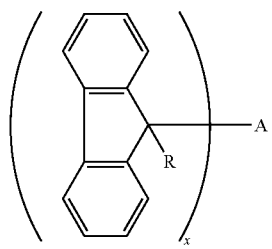

(I)

wherein R is OH, NH$_2$, halide, ester, amine, ether or amide, and x is 2-6 and A is an arene moiety having a molecular weight of less than about 10,000. When reacted with an aromatic polymer, such as a polyarylene ketone, it forms a thermally stable, cross-linked polymer. This technology allows for crosslinking of polymers previously believed non-crosslinkable, and which are thermally stable up to temperatures greater than 260° C. and even greater than 400° C. or more, depending on the polymer so modified, i.e., polysulfones, polyimides, polyamides, polyetherketones and other polyarylene ketones, polyureas, polyurethanes, polyphthalamides, polyamide-imides, aramids, and polybenzimidazoles.

U.S. Provisional Patent Application No. 61/716,800, co-owned by the Applicant of the present application describes a cross-linking composition comprising a cross-linking compound and a cross-linking reaction additive selected from an organic acid and/or an acetate compound. The cross-linking compound has a structure according to formula (I):

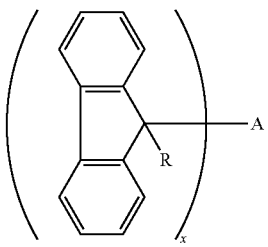

(II)

wherein A is an arene moiety having a molecular weight of less than 10,000 g/mol, R$^1$ is selected from a group consisting of hydroxide (—OH), amine (—NH$_2$), halide, ether, ester, or amide, and x=2.0 to 6.0, wherein the cross-linking reaction additive is capable of reacting with the cross-linking compound to form a reactive intermediate in the form of an oligomer, which reactive intermediate oligomer is capable of cross-linking an organic polymer.

In one embodiment, the cross-linking reaction additive is an organic acid which may be glacial acetic acid, formic acid, and/or benzoic acid. In another embodiment, the cross-linking reaction additive may be an acetate compound that a structure according to formula (III):

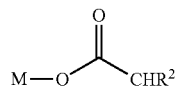

(III)

wherein M is a Group I or a Group II metal; and R$^2$ is an alkyl, aryl, or aralkyl group, wherein the alkyl group is a hydrocarbon group of 1 to about 15 carbon atoms having 0 to about 5 ester or ether groups along or in the chain of the hydrocarbon group, wherein R$^2$ may have 0 to about 5 functional groups that may be one or more of sulfate, phosphate, hydroxyl, carbonyl, ester, halide, mercapto or potassium. The acetate compound may be lithium acetate hydrate, sodium acetate and/or potassium acetate, and salts and derivatives thereof. These cross-linking compositions allow for control of a cross-linking reaction when combined with an organic polymer and can enable a lower rate of thermal cure, giving a broader window and better control during heat mold of the resultant cross-linked organic polymer. Such control can enable formation of polymers that are suitable for extreme conditions such as down-hole end applications.

While polyimides and polyamide-imide copolymers have higher glass transition temperatures of about 260° C. or more, they tend to not be useful in strong acids, bases or aqueous environments, as they suffer more easily from chemical attack. As a result, while their operating temperatures are more attractive, their chemical resistance properties limit their usefulness in sealing applications where the fluid medium is water based or otherwise harmful to the material. For example, testing of polyimide by applicant has shown about an 80% loss in properties after aging at 200° C. for three days in steam, using ASTM-D790 to test the flexural modulus.

Fully aromatic polysulfones such as polyether sulfone (PES) and polyphenyl sulfone (PPSU) may be used in such end applications, but their amorphous nature creates issues in that they are vulnerable to stress cracking in the presence of strong acids and bases. Due to the possibility of the amorphous polymers flowing at temperatures near their glass transition temperature over time, continuous use temperatures are typically set about 30° C. to 40° C. below the glass transition temperature. Thus, for continuous use for a polysulfone (PSU), the temperature is recommended to be set at 180° C. when the glass transition temperature is about 220° C.

Other problems encountered in more demanding end uses exposed to harsh chemicals, water and/or steam, include problems associated with a plasticizer effect caused when the polymer absorbs the chemical which can enhance motion of molecular chains and create a depression of the glass transition temperature from its normal state in the unswollen polymer.

A further issue is associated with creep. When polymers operate above their glass transition temperature, creep is a limiting factor for seal components which can deform under harsh conditions. Thus, to improve mechanical properties, prevent creep and resist extrusion, most high temperature polymers in use are filled for use as backup rings or molded components. The downside of use of fillers is that it typically drops the ductility tremendously. For example, unfilled PEEK has a tensile elongation of about 40%, whereas 30% carbon-filled PEEK has a tensile elongation at break of only 1.7%. Thus the material becomes more brittle from the strengthening filler, and the brittleness can result in part cracking under prolonged loadings. The use of fillers also causes a differential coefficient of thermal expansion in the mold versus the transverse direction of the molded parts. This can also cause significant molded-in stress. The end result is cracking over time due to creep rupture, even when a part is not under a significant load.

Thus, there is a need in the art for better and higher performing polymeric materials for sealing components, seal connectors and similar parts that can operate at high service temperatures associated with oilfield and other harsh conditions and industrial uses, but still maintain good mechanical performance, resist extrusion of the seal or connector material into a gap between two surfaces to be sealed or along the pin, and resist creep when in use, without becoming brittle and significantly losing its ductility.

BRIEF SUMMARY OF THE INVENTION

The invention includes a composition for formation of an extrusion-resistant sealing member, comprising: an aromatic polymer; and a crosslinking compound. The polymer may be one or more of a polyarylene polymer, a polysulfone, a polyphenylene sulfide, a polyimide, a polyamide, a polyurea, a polyurethane, a polyththalamide, a polyamide-imide, an aramid, a polybenzimidazole, and blends, copolymers and derivatives thereof. Preferably, the aromatic polymer is a polyarylene polymer and/or a polysulfone polymer, and blends, copolymers and derivatives thereof.

When the aromatic polymer is a polyarylene ether polymer, it may have repeating having units of structure according to formula (IV) below:

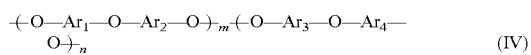

(IV)

wherein $Ar_1$, $Ar_2$, $Ar_3$ and $Ar_4$ are identical or different aryl radicals, m is 0 to 1, and n is 1-m.

If the aromatic polymer is a polyarylene-type polymer, it is preferably at least one of polyetheretherketone, polyetherketone, polyetherketoneetherketoneketone, polyetherketoneketone, polysulfone, polyphenylene sulfide, polyethersulfone, polyarylsulfone, and blends, copolymers and derivatives thereof.

The crosslinking compound preferably has a structure according to formula (II) below:

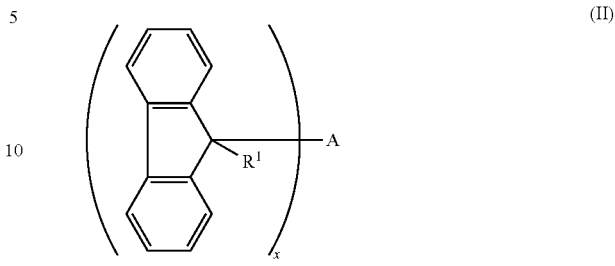

(II)

wherein A is an arene moiety having a molecular weight of less than 10,000 g/mol, $R^1$ is selected from a group consisting of hydroxide (—OH), amine (—$NH_2$), halide, ether, ester, or amide, and x=2.0 to 6.0.

The crosslinking compound is preferably 9,9'-(biphenyl-4,4'-diyl)bis(9H-fluoren-9-ol) and has a general structure according to formula (V):

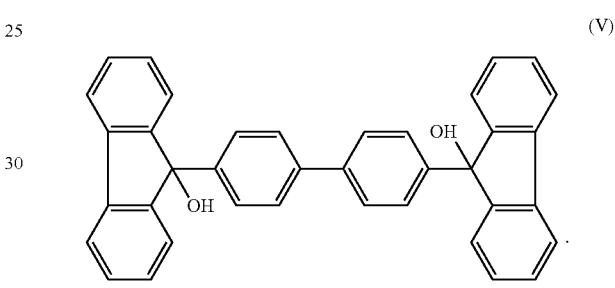

(V)

The composition noted above may also include a crosslinking reaction additive capable of reacting with the crosslinking compound to form a reactive intermediate in the form of an oligomer, which reactive intermediate oligomer is capable of cross-linking an organic polymer. The cross-linking reaction additive may be an organic acid which may be glacial acetic acid, formic acid, and/or benzoic acid. In another embodiment, the cross-linking reaction additive may be an acetate compound that has a structure according to formula (III):

(III)

wherein M is a Group I or a Group II metal; and $R^2$ is an alkyl, aryl, or aralkyl group, wherein the alkyl group is a hydrocarbon group of 1 to about 15 carbon atoms having 0 to about 5 ester or ether groups along or in the chain of the hydrocarbon group, wherein $R^2$ has 0 to about 5 functional groups.

Preferably, the compositions of the invention are unfilled compositions providing enhanced ductility in use, although, they may be filled if the user desires to fill the composition.

The invention also includes sealing components of a sealing assembly formed by a method comprising the step of crosslinking a composition as described herein.

A sealing connector is also included herein having a seal connector body formed by a method comprising the step of crosslinking a composition as described herein.

The invention further includes a method of improving extrusion- and creep-resistance of a component for use in a high temperature sealing element or seal connector, comprising, providing a composition comprising an aromatic polymer and a crosslinking compound, and subjecting the composition to a heat molding process to form the component and crosslink the aromatic polymer. The composition is preferably unfilled. The aromatic polymer and cross-linking compound may be any of those noted herein and described above, and the composition may also include the optional crosslinking reaction additive.

Also included herein are sealing components and sealing connectors formed by the method described above, wherein the composition may be filled or unfilled. The sealing component is a seal back-up element, a packer element, a labyrinth seal or a dual-lip sealing component.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
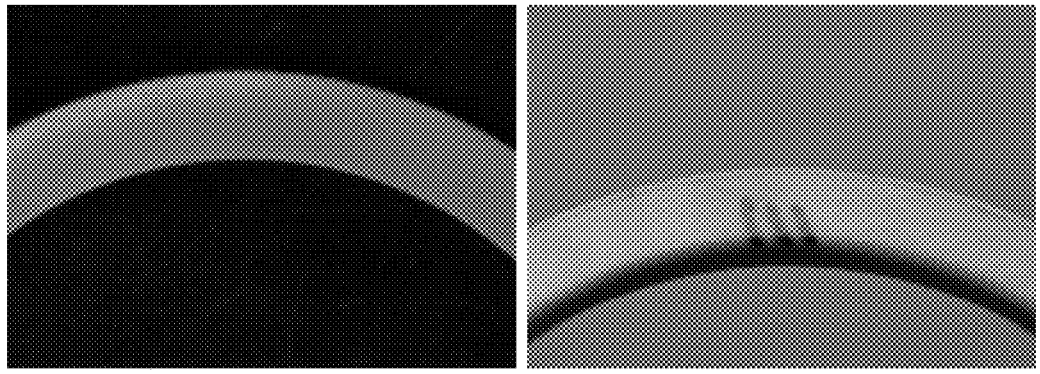
FIG. 1 is a photographic representation of a Prior Art PEEK back-up ring tested at 300° F. (149° C.) with 21,000 psi applied hydrostatic pressure to the top surface for 24 hours, wherein extrusion of 0.19 mm was measured on the outer edge of the ring.
Figure 2:
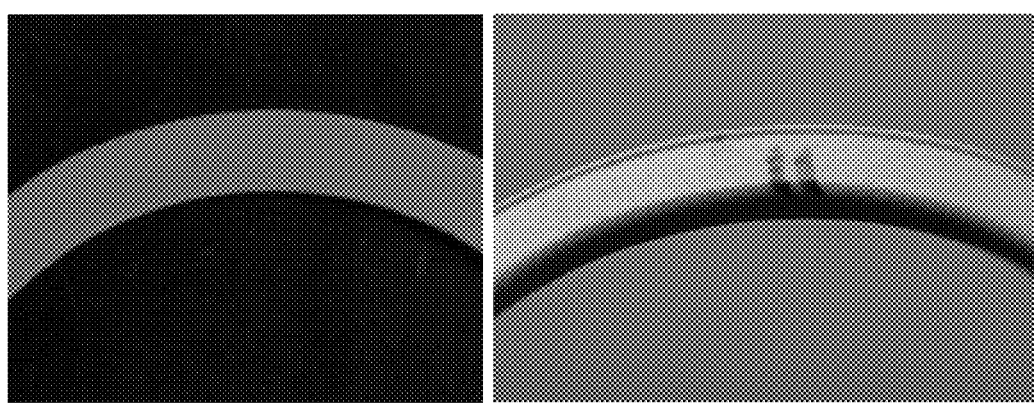
FIG. 2 is a photographic representation of the bottom surface of a Prior Art PEEK back-up ring tested at 450° F. (237° C.) with 11,000 psi applied hydrostatic pressure to the top surface for 24 hours. This loading at high temperature resulted in extrusion of 0.30 mm, a 60% increase in extrusion over that in FIG. 1, but at only one-half the applied pressure.
Figure 3:
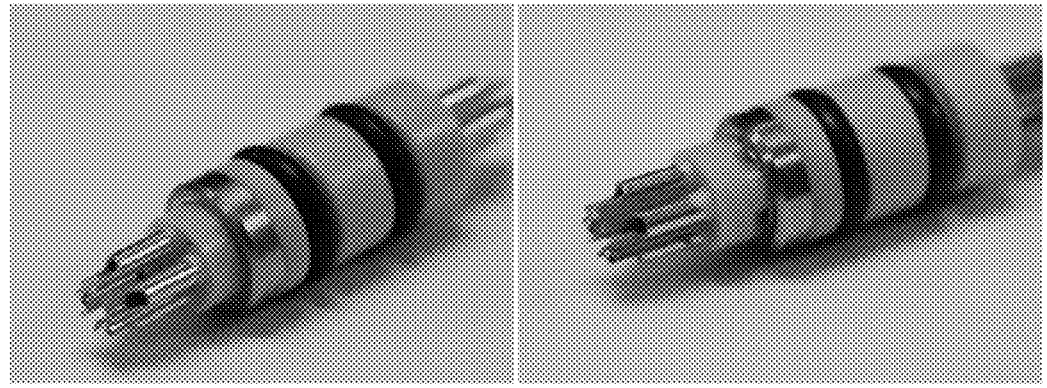
FIG. 3 is a Prior Art SealConnect® connector formed of polyether ketone (PEK) before and after application of 20,000 psi hydrostatic pressure and 300° F. (149° C.) for 24 hours.

Applicants herein describe compositions and methods of making sealing components, seal connectors and the like that resist creep and extrusion and maintain good mechanical properties at high continuous use temperatures and in end uses requiring good chemical resistance as well.

The composition described herein are extrusion-resistant and creep-resistant, while maintaining good sealing and ductility properties. The compositions are useful for forming sealing members or sealing connectors and similar components used in harsh and/or high temperature conditions. As used herein, a "high temperature" environment is meant in its ordinary meaning, and one skilled in the art would know that high temperature environments include those in which service temperatures are at or above the glass transition temperature of the polymer in service. Concerning the polymers discussed herein, such high temperature environments are typically those over 177° C. (350° F.). The compositions include an aromatic polymer and a crosslinking compound and may include optional cross-linking reaction additives if desired. Upon crosslinking the compositions, a component may be formed having the desired high-temperature properties. The cross-linking reactions herein raise the glass transition temperature of the resulting product such that in use, it functions better and resists extrusion. The improvement of the properties is far better than expected allowing for use of unfilled compositions in high temperature and/or harsh conditions such as downhole environments. This is a significant unexpected advantage in that the user can avoid having to fill the compound to achieve desired mechanical properties in use and to help resist creep. Instead, the user is able to maintain good mechanical properties, resist creep and extrusion while keeping the desired sealing ductility and tensile elongation that make sealing components function well in the gland.

The polymer used herein may be one or more of aromatic polymers known and/or selected for high temperature or creep-resistant use, including polyarylene polymers, polysulfones, polyphenylenesulfides, polyimides, polyamides, polyureas, polyurethanes, polyththalamides, polyamide-imides, aramids, polybenzimidazoles, and blends, copolymers and derivatives thereof. Preferably, the aromatic polymer is a polyarylene polymer and/or a polysulfone polymer, and blends, copolymers and derivatives thereof. If the aromatic polymer is a polyarylene-type polymer, it is preferably at least one of polyetheretherketone (PEEK), polyetherketone (PEK), polyetherketoneetherketoneketone (PEKEKK), polyetherketoneketone (PEKK), polysulfone (PSU), polyethersulfone (PES), polyarylsulfone (PAS), and blends, copolymers and derivatives thereof.

When the aromatic polymer is a polyarylene ether polymer, it may have repeating having units of structure according to formula (IV) below:

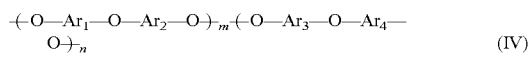
(IV)

wherein $Ar_1$, $Ar_2$, $Ar_3$ and $Ar_4$ are identical or different aryl radicals, m is 0 to 1, and n is 1-m.

In one preferred embodiment, the organic polymer is a polyarylene ether having a structure according to the general structure above wherein n is 0 and m is 1, with repeating units according formula (VI) and having a number average molecular weight (Mn) of about 10,000 to about 30,000:

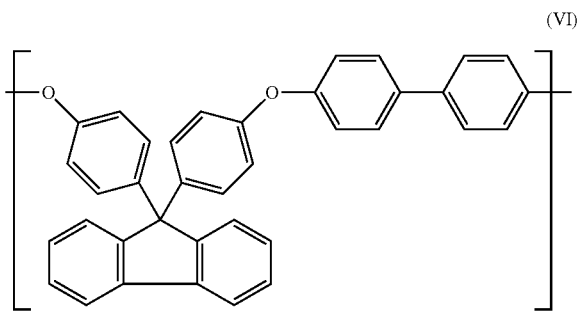
(VI)

Such organic polymers may be obtained commercially for example, as Ultura™ from Greene, Tweed and Co., Inc., Kulpsville, Pa.

The crosslinking compound preferably has a structure according to formula (II) below:

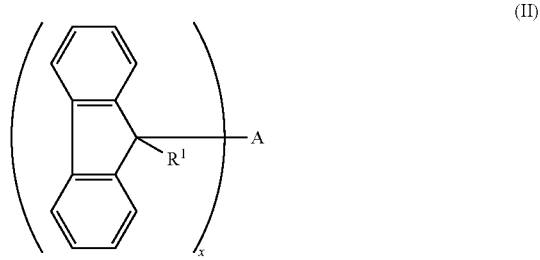
(II)

wherein A is an arene moiety having a molecular weight of less than 10,000 g/mol, $R^1$ is selected from a group consisting of hydroxide (—OH), amine (—$NH_2$), halide, ether, ester, or amide, and x=2.0 to 6.0.

The crosslinking compound is preferably 9,9'-(biphenyl-4,4'-diyl)bis(9H-fluoren-9-ol) and has a general structure according to formula (V):

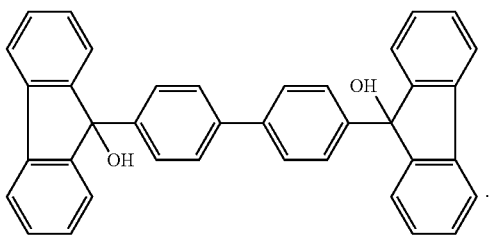
(V)

The cross-linking compound(s) if used with an optional cross-linking reaction additive(s) can be reacted to form a reactive oligomerized cross-linking intermediates either in situ during thermal molding with the cross-linkable organic polymer, and/or by reacting prior to combining with a cross-linkable organic polymer and then heat molding to form an article. IF the additive is not used, the crosslinking compound(s) and the organic polymer(s) can be reacted prior to molding, for example, in a solvent reaction, but are preferably compounded and include non-solvent precipitation or mechanical blending. One preferred method is making a powder blend via mechanical mixing. Mechanical blending may be done by a variety of methods, including mechanical mixing via twin screw extrusion.

If a cross-linking additive is used to form a reactive intermediate, the intermediate oligomer reaction product of the cross-linking compound with the crosslinking reaction additive enables control of a cross-linking reaction when combined with an organic polymer and can enable a lower rate of thermal cure, to allow a broader window and better control during heat molding of the resultant cross-linked organic polymer.

Figure 16:
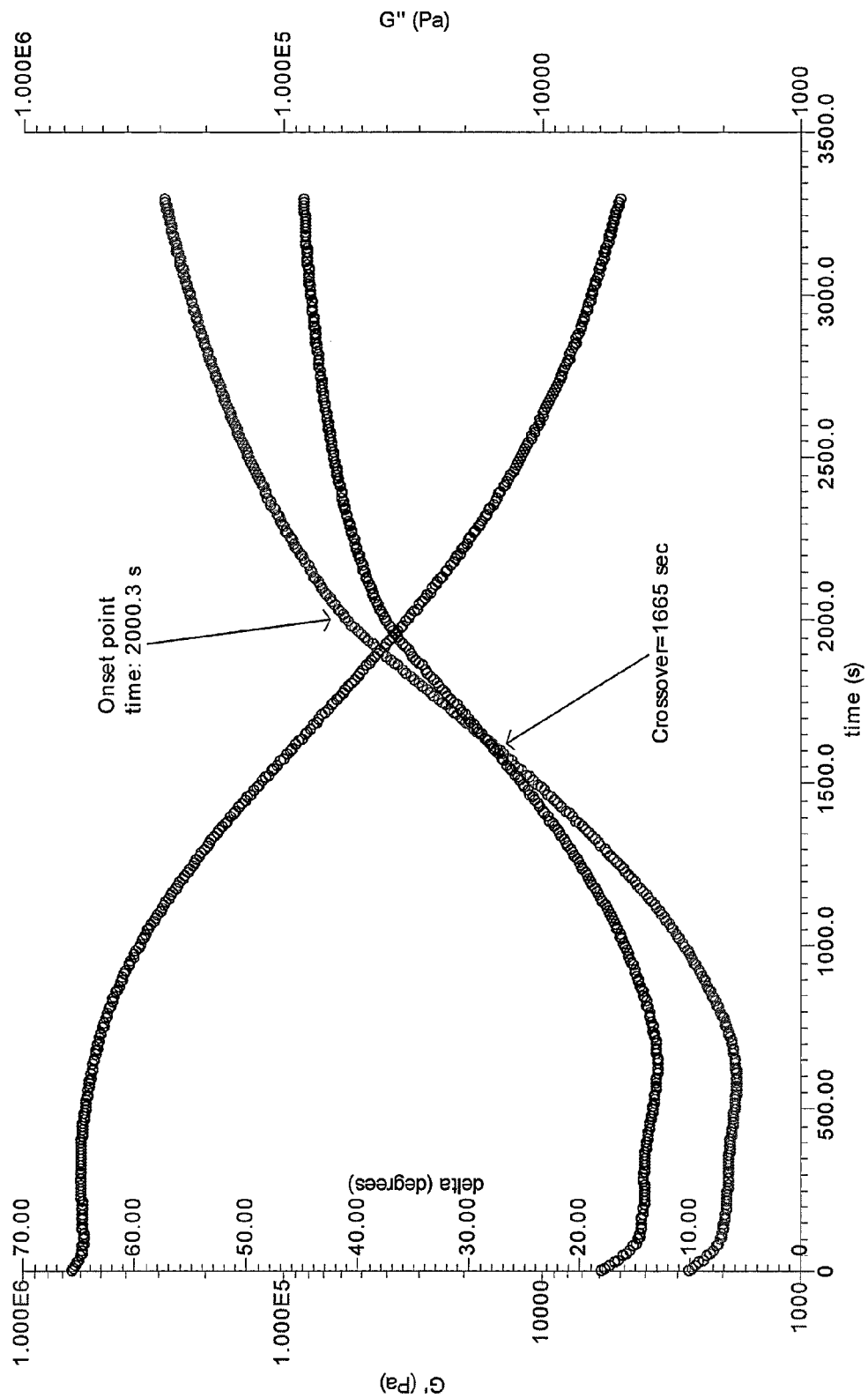
FIG. 16 is a prior art graph from Parallel Plate Rheology of Blend 3, at 380° C., referenced to J. Mercel et al., "Thermal Analysis of Polymers: Fundamentals and Applications," p. 445, Wiley, ed. 1 (2009).

In general, formation of cross-links in an organic polymer cross-linking to itself or in an organic polymer composition including an unmodified cross-linking compound may be completed within about 2 minutes at about 380° C., the typical processing temperature of polyetherether ketone (PEEK). The extent of this reaction can be tracked by dynamic viscosity measurements. Two methods are often used to judge when a reaction may be completed. The point where storage modulus G' equals Loss modulus G", called the crossover point or gel point, indicates the onset of gel formation where cross-linking has produced an interconnected. As curing continues, G' will increase, which is an indication of cross-link density. As curing continues, eventually G' will level off, which indicates that most curing is completed. The inflection point G', which indicates onset of vitrification can also be used in cases where no obvious cross-over point can be determined. (See FIG. 16). The time required to attain G', G" crossover or the onset of vitrification can be used as the upper limit of process time for a thermosetting material:

Utilization of one or more cross-linking reaction additive(s) can assist in providing polymers with even higher glass transition temperatures and higher cross-link density if desired. Polymers with high thermal stability of up to 500° C. and high crosslink density, while desirable, display a very high melt viscosity before further processing, and thus are very difficult to melt process. As curing of the cross-linked polymer may be initiated during heat molding, it is desirable to control when cross-linking begins. If the rate of cross-linking is not controlled before molding of a composition into a final article, the article of manufacture may begin to prematurely cure before or during heat molding or proceed too rapidly causing incomplete mold fill, equipment damage, and inferior properties in the article. Thus, the additive can provide control of the rate of cross-link formation in an organic polymer for reactions in polymers where control is more difficult.

The addition of the optional cross-linking reaction additive to the cross-linking compound used for cross-linking the organic aromatic polymers herein can delay the onset of cross-linking in the organic polymer for as much as several minutes to allow for rapid processing and shaping of the resultant organic polymer structures in a controlled manner.

One or more cross-linking compounds is/are present in the cross-linking composition and organic polymer compositions herein. Preferably, the cross-linking compound has a structure according to formula (II):

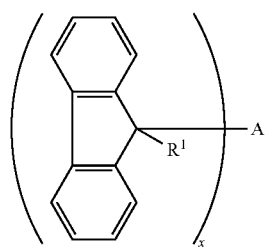

(II)

wherein A is an arene moiety having a molecular weight of less than 10,000 g/mol. $R^1$ can be hydroxide (—OH), amine (—$NH_2$), halide, ether, ester, or amide, and x is about 2.0 to about 6.0.

The arene moiety A on the cross-linking compound above provides the cross-link site for forming more complex cross-linking compound structures, including, for example, without limitation:

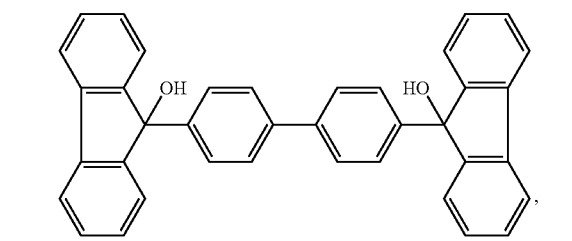

,

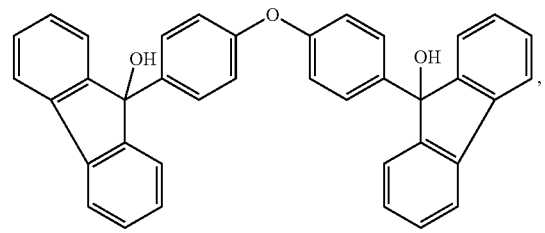

,

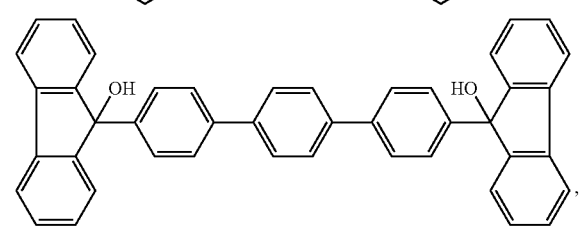

,

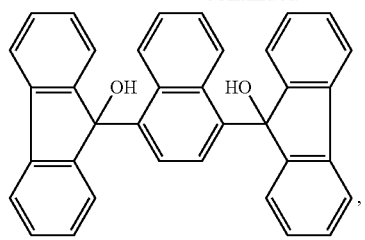

,

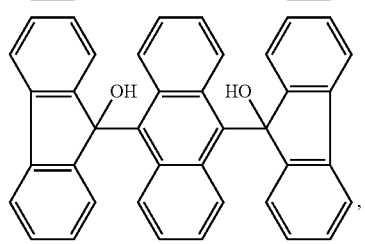

,

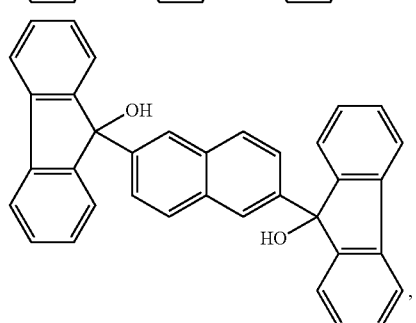

,

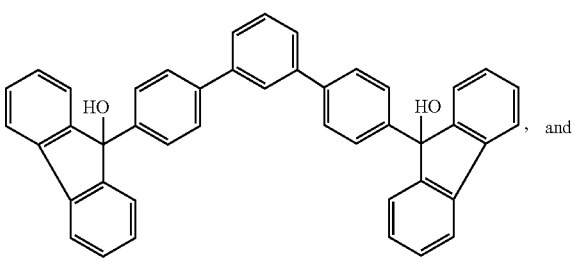

, and

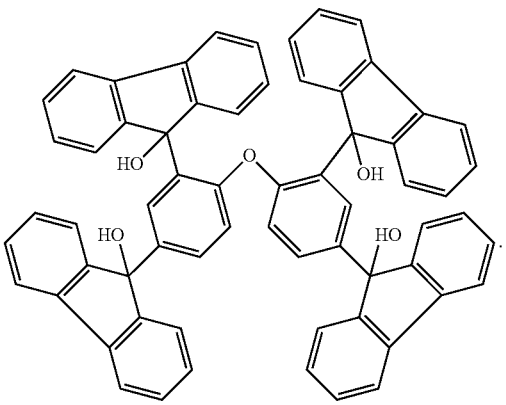

.

The arene moiety A may be varied to have different structures, including, but not limited to the following:

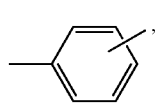

,

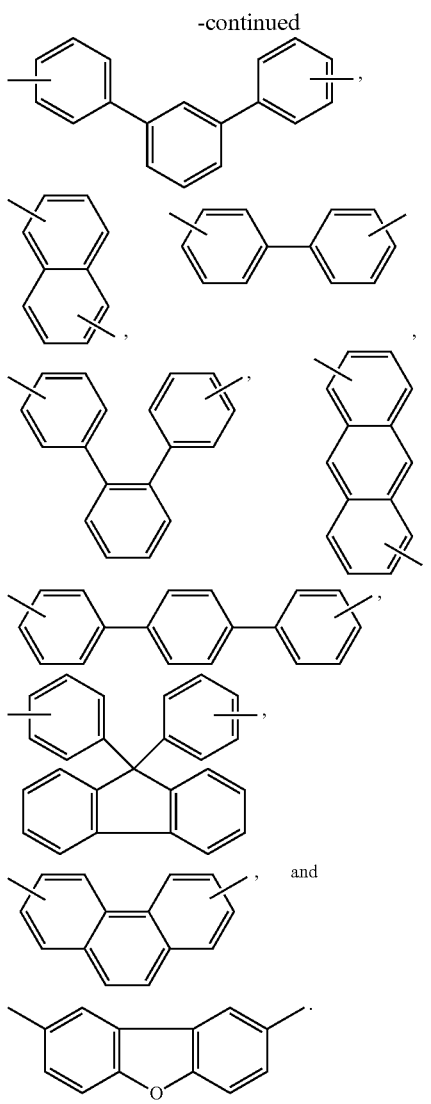

The arene moiety A is most preferably the diradical of 4,4'-biphenyl, or

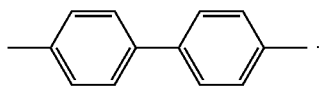

The arene moiety A may also be functionalized, if desired, using one or more functional groups such as, for example, and without limitation, sulfate, phosphate, hydroxyl, carbonyl, ester, halide, or mercapto.

The cross-linking compound can be formed, for example, by treating a halogenated arene with an alkyllithium in order to exchange the halogen with lithium, followed by the addition of 9-florenone and acid. This method of formation is described and shown in more detail in co-pending International Patent Application No. PCT/US2011/061413, which is incorporated herein by reference in relevant part.

The cross-linking composition and the organic polymer composition may also contain an optional cross-linking reaction additive. The cross-linking reaction additive(s) include organic acids and/or acetate compounds, which can promote oligomerization of the cross-linking compound. In one embodiment, the oligomerization can be carried out by acid catalysis using one or more organic acid(s), including glacial acetic acid, acetic acid, formic acid, lactic acid, citric acid, oxalic acid, uric acid, benzoic acid and similar compounds. An oligomerization reaction using one of the cross-linking compounds listed above is as follows:

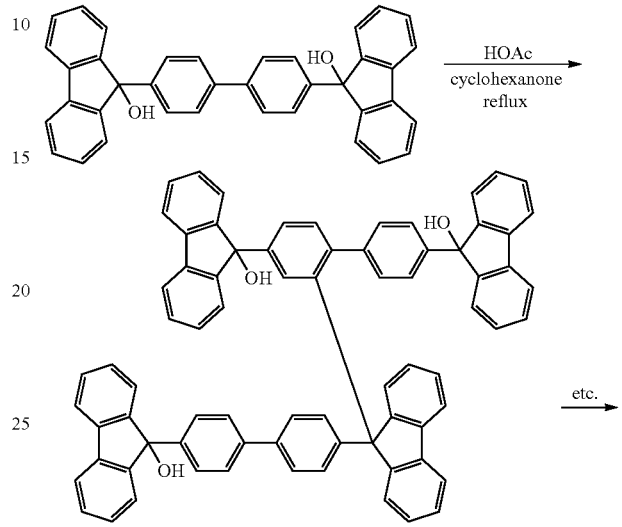

In another embodiment, the cross-linking reaction additive may be an acetate compound that has a structure according to formula (III):

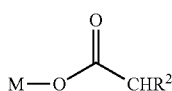

(III)

wherein M is a Group I or a Group II metal. $R^2$ in Formula (II) may preferably be an alkyl, aryl or aralkyl group. For example, $R^2$ may be a hydrocarbon group of 1 to about 15 carbon atoms, including normal chain and isomeric forms of methyl, ethyl, propyl, butyl, pentyl, hexyl, heptyl, octyl, nonyl, decyl, ethenyl, propenyl, butenyl, hexenyl, heptenyl, octenyl, nonenyl, decenyl, and the like. $R^2$ may also have from 0 to about 5 ester or ether groups along or in a chain of the hydrocarbon group. Suitable $R^2$ aryl and aralkyl groups, including those based on phenyl, naphthyl, and similar groups, which may each include optional lower alkyl groups on the aryl structure of from 0 to about 5 carbon atoms. $R^2$ may further include 0 to about 5 functional groups if desired such as sulfate, phosphate, hydroxyl, carbonyl, ester, halide, mercapto and/or potassium on the structure.

Oligomerization of the cross-linking compound with an acetate compound can afford the same resultant oligomerized cross-linking composition as achieved when adding an organic acid. The cross-linking reaction additive may be lithium acetate hydrate, sodium acetate, potassium acetate, rubidium acetate, cesium acetate, francium acetate, beryllium acetate, magnesium acetate, calcium acetate, strontium acetate, barium acetate, and/or radium acetate, and salts and derivatives thereof. More preferably, the cross-linking reaction additive is lithium acetate hydrate, sodium acetate and/or potassium acetate, and salts and derivatives of such compounds. An oligomerization reaction using of one of the cross-linking compounds can proceed as follows:

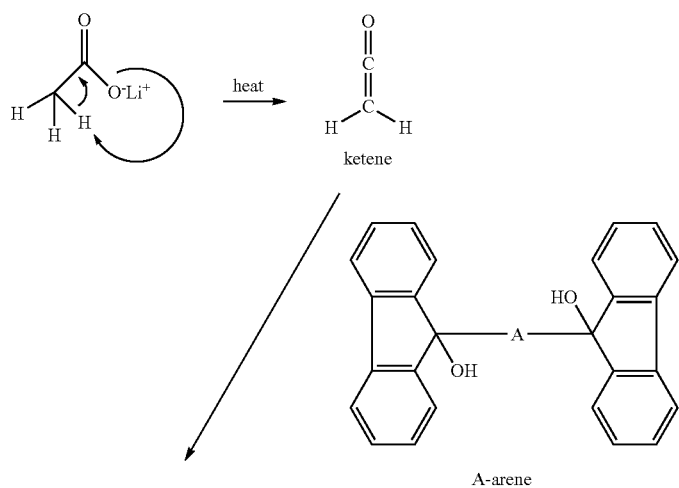
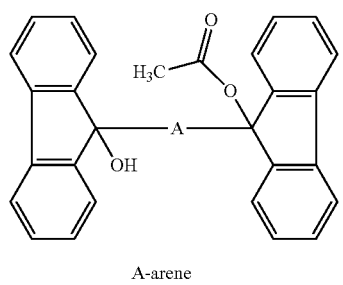
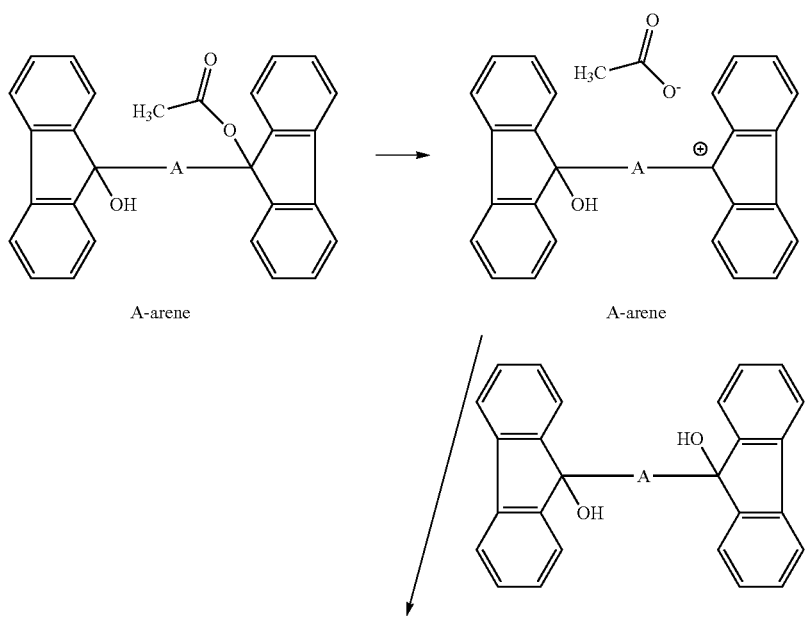

-continued

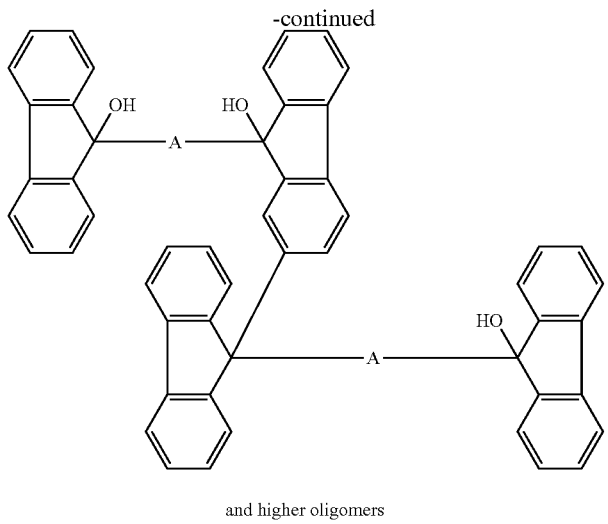

and higher oligomers

A cross-linking composition formed of just the cross-linking compound and any optional crosslinking reaction additive preferably has a weight percentage ratio of the cross-linking compound to any cross-linking reaction additive of about 10:1 to about 10,000:1, and more preferably about 20:1 to about 1000:1 for achieving the best results from such an additive. In making the cross-linking composition, in one embodiment, the components are combined prior to addition of an organic polymer to make an organic polymer composition. Alternatively, they may all be combined simultaneously or the cross-linking compound simply combined with the aromatic polymer.

The amount of the cross-linking compound in a cross-linking composition including just the cross-linking compound and any optional cross-linking reaction additive is preferably about 70% by weight to about 98% by weight, more preferably about 80% by weight to about 98% by weight, and most preferably about 85% by weight to about 98% by weight based on the weight of the cross-linking composition. The amount of the cross-linking reaction additive in the cross-linking composition is preferably about 2% by weight to about 30% by weight, more preferably about 2% by weight to about 20% by weight, and most preferably about 2% by weight to about 15% by weight.

The organic polymer composition preferably has a weight percentage ratio of the organic polymer to the weight of the cross-linking compound (or combined weight of the cross-linking compound and any optional cross-linking reaction additive) of about 1:1 to about 100:1, and more preferably about 3:1 to about 10:1 for achieving the best results.

In making the organic polymer composition, it is preferred that the cross-linking compound and optional cross-linking reaction additive components if present are combined prior to addition of an aromatic polymer to make the moldable composition. Alternatively, they may all be combined simultaneously.

The amount of the cross-linking compound in the moldable aromatic polymer composition is preferably about 1% by weight to about 50% by weight, more preferably about 5% by weight to about 30% by weight, and most preferably about 8% by weight to about 24% by weight based on the total weight of an unfilled moldable organic composition including the cross-linking compound and the organic polymer (and any optional crosslinking additive).

The amount of the cross-linking reaction additive, if used in the moldable aromatic polymer composition is preferably about 0.01% by weight to about 33% by weight, more preferably about 0.1% by weight to about 10% by weight, and most preferably about 0.2% by weight to about 2% by weight based on the total weight of an unfilled polymer composition including the cross-linking compound and the organic polymer and the optional crosslinking additive.

The amount of the aromatic polymer in the moldable aromatic polymer composition is preferably about 50% by weight to about 99% by weight, more preferably about 70% by weight to about 95% by weight, and most preferably about 75% by weight to about 90% by weight based on the total weight of an unfilled polymer composition including the cross-linking compound and the organic polymer, along with any optional cross-linking reaction additive.

It is preferred that the compositions herein remain unfilled, particularly with respect to strength additives that may impact ductility and tensile elongation. However, it is also within the scope of the invention that the organic polymer composition may further be filled and/or reinforced and include one or more additives to improve the modulus, impact strength, dimensional stability, heat resistance and electrical properties of composites and other finished articles of manufacture formed using the polymer composition. These additive(s) can be any suitable or useful additives known in the art or to be developed, including without limitation continuous or discontinuous, long or short, reinforcing fibers such as, for example, carbon fiber, glass fiber, woven glass fiber, woven carbon fiber, aramid fiber, boron fiber, PTFE fiber, ceramic fiber, polyamide fiber and the like; and/or one or more fillers such as, for example, carbon black, silicate, fiberglass, calcium sulfate, boron, ceramic, polyamide, asbestos, fluorographite, aluminum hydroxide, barium sulfate, calcium carbonate, magnesium carbonate, silica, alumina, aluminum nitride, borax (sodium borate), activated carbon, pearlite, zinc terephthalate, graphite, talc, mica, silicon carbide whiskers or platelets, nanofillers, molybdenum disulfide, fluoropolymer fillers, carbon nanotubes and fullerene tubes. Preferably, the additive(s) include reinforcing fiber such as continuous or discontinuous, long or short, carbon fiber, PTFE fiber, and/or glass fiber.

In making the organic polymer composition, it is preferred that the additive(s) is/are added to the composition along with or at about the same time that the cross-linking compound is combined with the organic polymer to make an organic polymer composition, however, the manner of providing reinforcing fibers or other fillers may be according to various techniques for incorporating such materials and should not be considered to limit the scope of the invention. The amount of additives is preferably about 0.5% by weight to about 65% by weight based on the weight of the organic polymer composition, and more preferably about 5.0% by weight to about 40% by weight, and even more preferably, used very sparingly if at all, with the most preferred embodiment being unfilled.

In addition, the organic polymer composition may further comprise other compounding ingredients, including stabilizers, flame retardants, pigments, plasticizers, surfactants, and/or dispersants such as those known or to be developed in the art to aid in the manufacturing process. The amount of the compounding ingredients that can be combined into the organic polymer composition, if used, is preferably about 5% by weight to about 60% by weight of a total of such ingredients based on the weight of the organic polymer composition, more preferably about 10% by weight to about 40% by weight, and most preferably about 30% by weight to about 40% by weight, and preferably significantly less than these amounts if they are not otherwise needed.

Preferably, the compositions of the invention are unfilled compositions providing enhanced ductility in use, although, they may be filled if the user desires to fill the composition.

Detailed descriptions on formation of the invention are provided in co-pending Application 61/716,800, incorporated herein in relevant part. Heat molding to form an article of manufacture may be accomplished by any method known or to be developed in the art including but not limited to heat cure, cure by application of high energy, heat cure, press cure, steam cure, a pressure cure, an e-beam cure or cure by any combination of means, etc. Post-cure treatments may also be applied, if desired. The organic polymer compositions of the present invention are cured by exposing the composition to temperatures greater than about 250° C. to about 500° C., and more preferably about 350° C. to about 450° C.

The compositions and/or the methods described above may be used in or to prepare articles of manufacture of downhole tools and applications used in the petrochemical industry. Particularly, the article of manufacture is selected from the group consisting of acid-resistant coatings, chemical-casted films, extruded films, solvent-casted films, blown films, encapsulated products, insulation, packaging, composite cells, sealing connectors, and sealing assemblies having back-up rings, packer elements, labyrinth seals for pumps and MSE® seals (available from Greene, Tweed & Co., Inc. of Kulpsville) having a dual-lip design, and other anti-extrusion and anti-creep components in the shape of O-rings, V-rings, U-cups, gaskets, bearings, valve seats, adapters, wiper rings, chevron back-up rings, and tubing.

The invention also includes sealing components of a sealing assembly formed by a method comprising the step of crosslinking a composition as described herein.

A sealing connector is also included herein having a seal connector body formed by a method comprising the step of crosslinking a composition as described herein.

The invention further includes a method of improving extrusion- and creep-resistance of a component for use in a high temperature sealing element or seal connector, comprising, providing a composition comprising an aromatic polymer and a crosslinking compound, and subjecting the composition to a heat molding process to form the component and crosslink the aromatic polymer as described above. The composition is preferably unfilled. The aromatic polymer and cross-linking compound may be any of those noted herein and described above, and the composition may also include the optional cross-linking reaction additive.

The invention will now be described in accordance with the following, non-limiting examples:

Example 1

Figure 4:
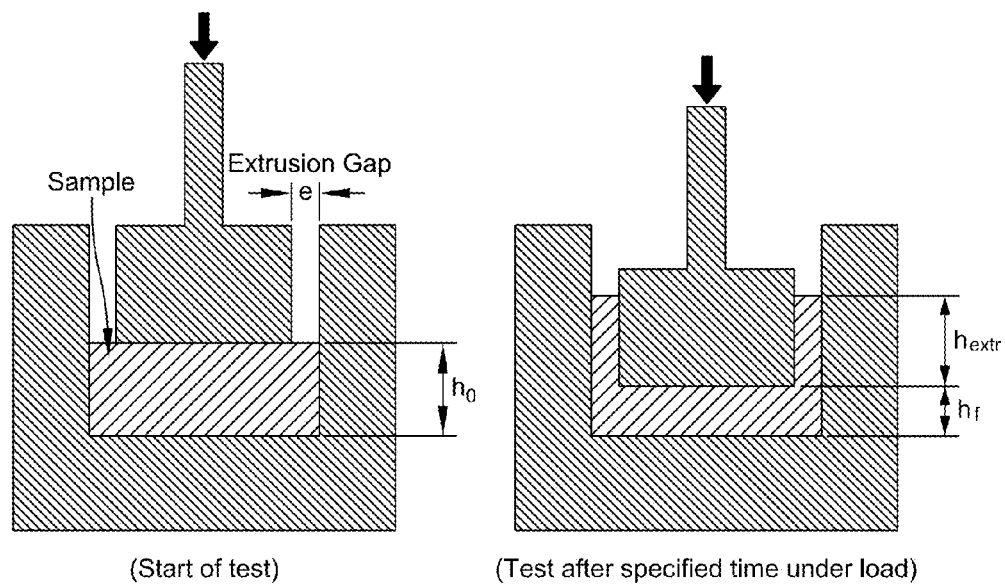
FIG. 4 is a schematic representation of a backup ring extrusion simulation test used in Example 1.

FIG. 4 shows a backup ring extrusion simulation test schematic used in the following example.

Simulated Backup Ring Extrusion Test Method.

A cylindrical material specimen with a diameter of 0.5 inches and a thickness of 0.12 inches was inserted into the test fixture shown in FIG. 4. A load was applied to the ram to generate the specified pressure.

Figure 5:
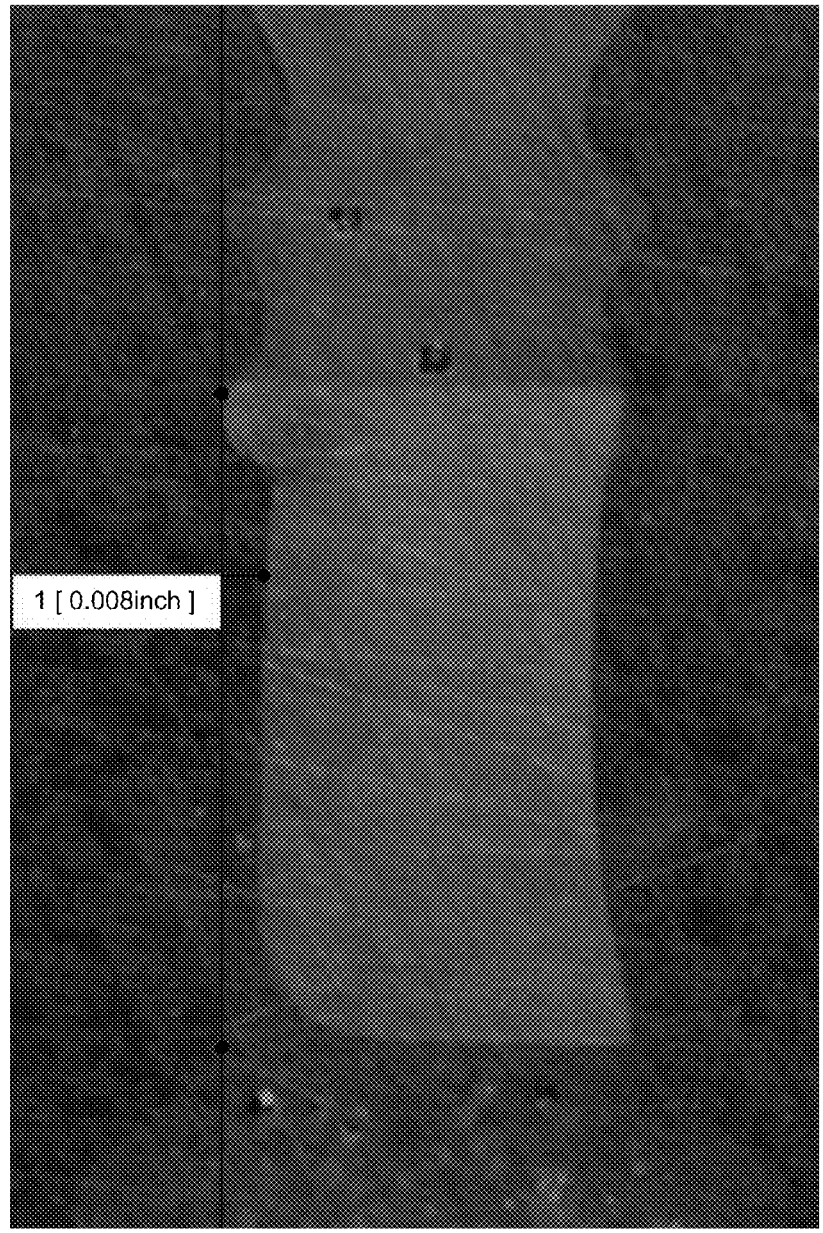
FIG. 5 is photographic representation of a 17% crosslinked PEEK backup ring cut in cross section, after the 450° F. and 40,000 psi functional test for a sample made according to an embodiment of the invention in Example 1 and showing very minor extrusion in the sample.

Tests were conducted using an MTS Servohydraulic Universal Tester with a 100 kN load capacity with an environmental chamber. The load cell used for all tests also had the full 100 kN capacity. For the test results presented below, a 0.020" (0.51 mm) extrusion gap (e) was used. Test conditions were a temperature of 290° C., with 35,000 psi applied force for time periods up to 3 h. Tests were stopped at the specified times, and samples were cross-sectioned to measure the extrusion length, $h_{extr}$. Results are shown in photographs in FIGS. 5 and 6, and summarized in Table 1.

Simulated Backup Ring Extrusion Test Method-Results

The cross-linked PEEK formed according to the invention had a much lower extrusion, and unexpectedly surpassed even standard filled grades typically used for creep/extrusion resistance.

Figure 7:
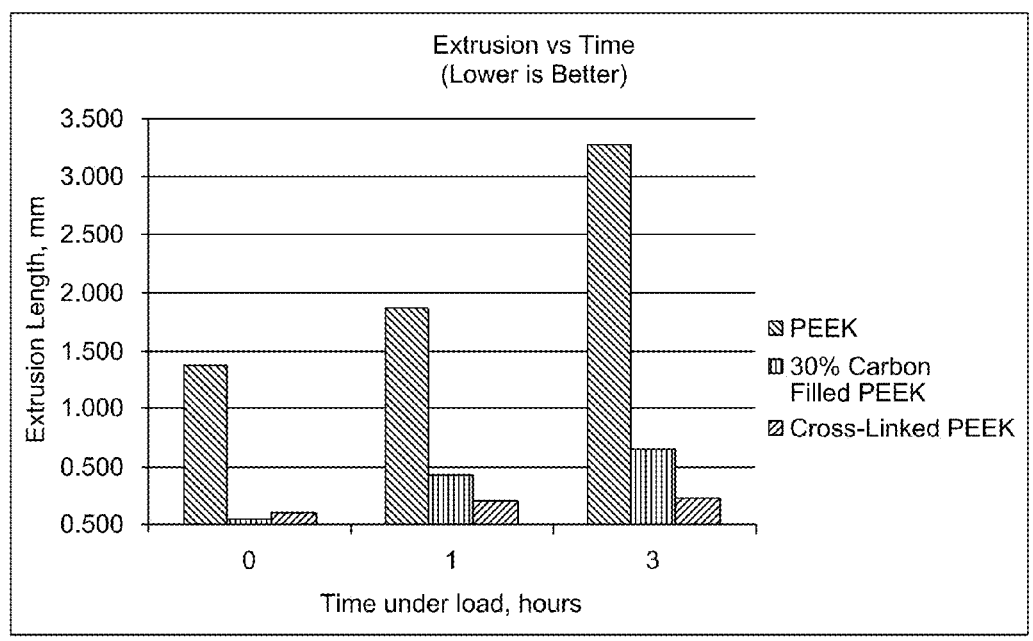
FIG. 7 is a graphical representation of results of the simulated backup ring extrusion test in Example 1.

FIG. 7 shows a graphical representation of results of simulated backup ring extrusion test. A summary of the extrusion lengths at various times is included in Table 1 below. Note that lower values are preferred for this test.

TABLE 1

| Material | Extrusion Height (mm) (static) | Extrusion Height (mm) (1 hr creep) | Extrusion Height (mm) (3 hrs creep) |
| --- | --- | --- | --- |
| PEEK | 1.38 | 1.88 | 3.29 |
| 30% Carbon Filled PEEK | 0.06 | 0.44 | 0.66 |
| Cross-Linked PEEK | 0.11 | 0.21 | 0.24 |

Functional Product Testing

For functional testing, back-up ring samples were prepared and tested in a unidirectional seal assembly, pressurized to 40,000 psi applied hydrostatic pressure at 450° F., with an extrusion gap of 0.010 inches. Pressure was ramped up to 40,000 psi and held for a total pressurization of 48 hours.

For reference, a sample of 40% Carbon fiber-filled PEEK was included as a comparative example. This backup ring was tested under comparable conditions, but at a lower temperature and pressure for a longer period of time (400° F., 30,000 psi, 72 hrs). The extrusion gap for the carbon-filled backup ring was approximately the same as the cross-linked PEEK samples (0.012 inches v. 0.010 inches for the cross-linked PEEK). However, the cross-linked PEEK was unfilled. Two different levels of cross-linking (at 22% and 17%) were used in different samples also for comparison.

Figure 8:
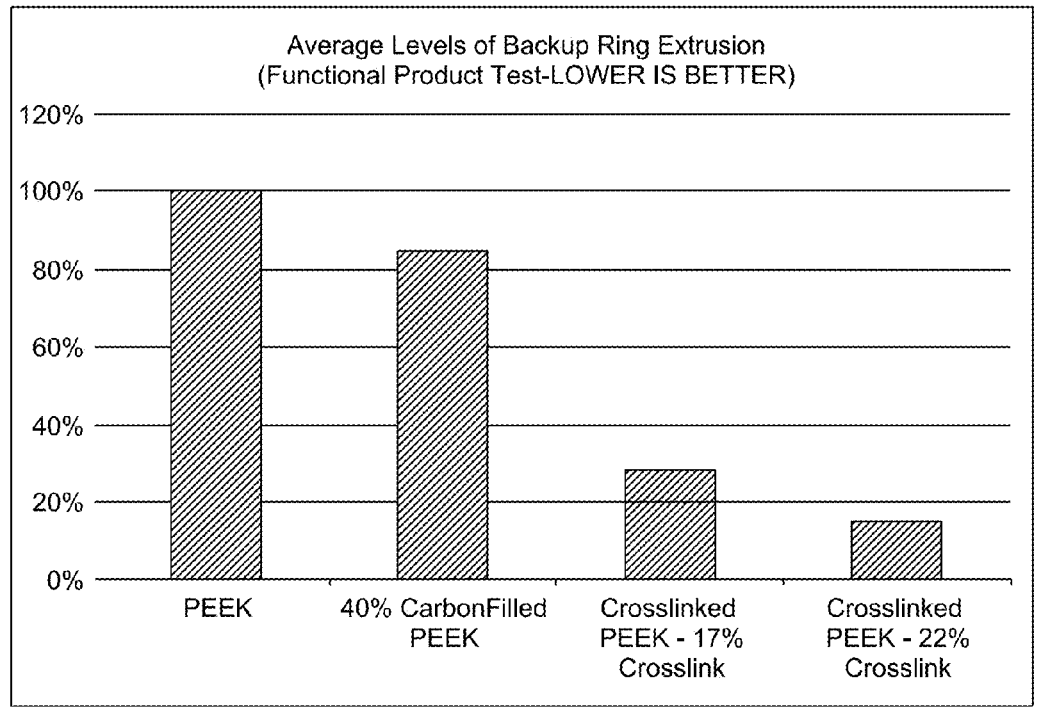
FIG. 8 is a graphical representation of the extrusion resistance for the samples tested in the extrusion product function test in Example 1.

Higher levels of cross-linking were also shown to result in lower extrusion (better performance for the 22% sample than the 17% sample). Further, as the graphical results in FIG. 8 show the significantly better extrusion resistance for crosslinked PEEK relative to the carbon filled PEEK.

Figure 5A:
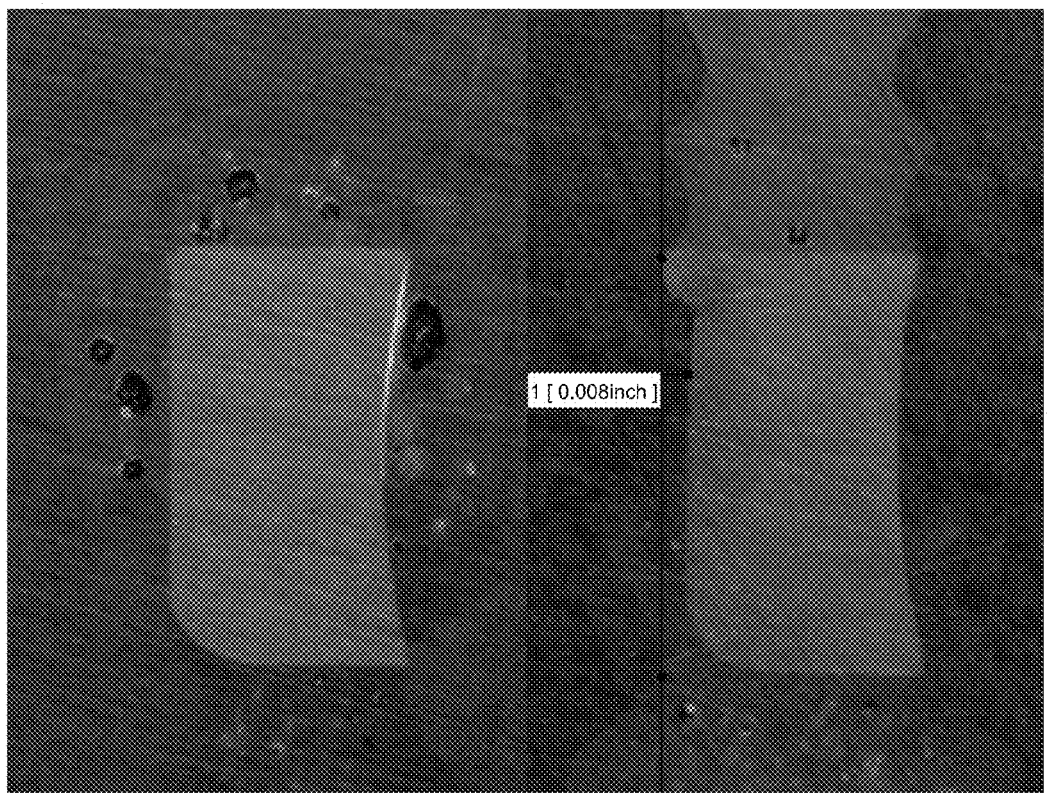
FIG. 5A is a photographic representation of a PEEK back-up ring cut in cross-section after being tested at the same conditions as the 17% cross-linked PEEK of FIG. 5 according to Example 1, wherein the PEEK back-up ring shows a 0.030 in. extrusion.
Figure 6:
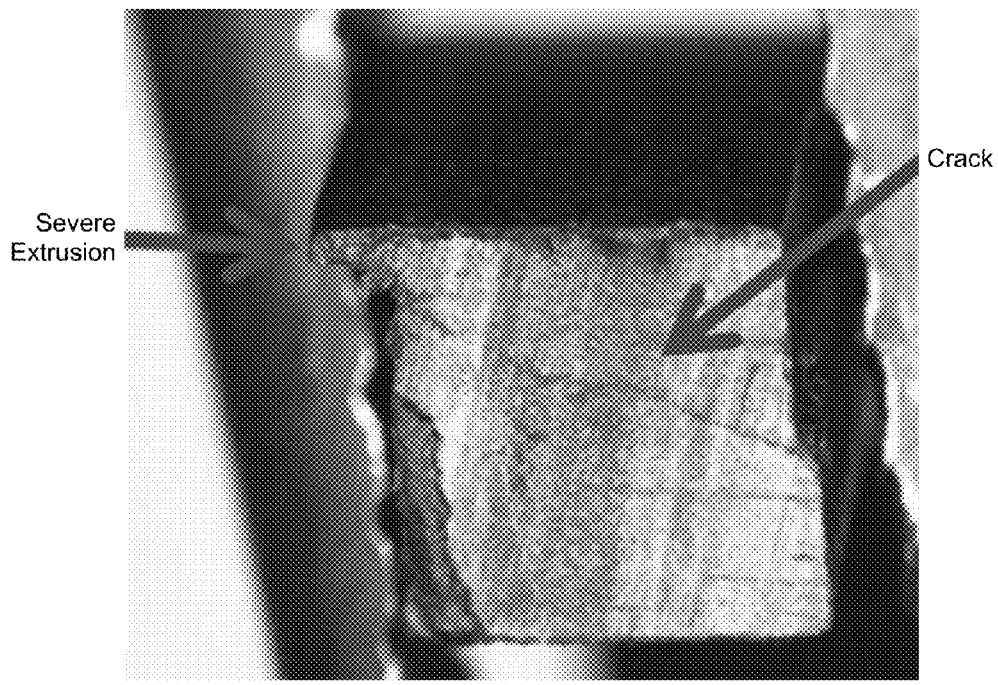
FIG. 6 is a photographic representation of a sample of a standard 40% carbon-filled PEEK backup ring cut in cross-section for comparative purposes after functional testing at 400° F. and 30,000 psi, showing cracking amounting to a catastrophic failure, and source for potential leaking for fluid across a seal stack if put into use.

The carbon-filled PEEK sample showed severe cracking and deformation after the test (see, FIG. 5), whereas the cross-linked PEEK showed only minimal extrusion and deformation (see, FIG. 6). See, also the PEEK sample at FIG. 5A.

In forming the samples herein, the material was injection molded, then post-cured to complete thermal cross-linking. It could be compression molded or extruded.

The specific materials used included a diol mixed with PEEK, specifically a 17% by weight mixture of (9,9'-(biphenyl-4,4'-diyl)bis(9H-fluoren-9-ol)) incorporating an optional cross-linking additive in the form of 0.75% lithium acetate. The mixture was blended with 83% of a 5000 grade FP PEEK in a Turbula® mixer. The powder mixture was compounded in a HAAKE® twin screw extruder at temperatures of 390° C. to 400° C.

The pellets were injection molded into 0.55 in. by 2.5 in. rods for extrusion test specimens, or tubes with an outer diameter (OD) of 1.350 and an inner diameter (ID) 0.875 for back-up ring specimens. Shapes were molded on an Arburg 66 Ton Model 320-C with a 25 mm barrel. The samples were post-cured at elevated temperatures to complete the cross-linking reaction. The rods and backup ring specimens were machined to the required dimensions prior to testing.

Example 2

Data concerning the glass transition temperature of several samples was collected on an AR2000DMA in torsional mode. Tests were conducted in air atmosphere at a temperature ramp rate of 5 C/minute. Glass transition temperature measured using DMA is different than the same property measured by use of a DSC as is known to those skilled in the art. The DMA data is incorporated below in Table 2.

TABLE 2

| Material | Tg onset (° C.) | Tg tan delta (° C.) |
| --- | --- | --- |
| PEEK | 156 | 172 |
| PEKEKK | 173 | 191 |
| 17% Crosslinked PEEK | 173 | 210 |
| 22% Crosslinked PEEK | 174 | 225 |

Example 3

Figure 9:
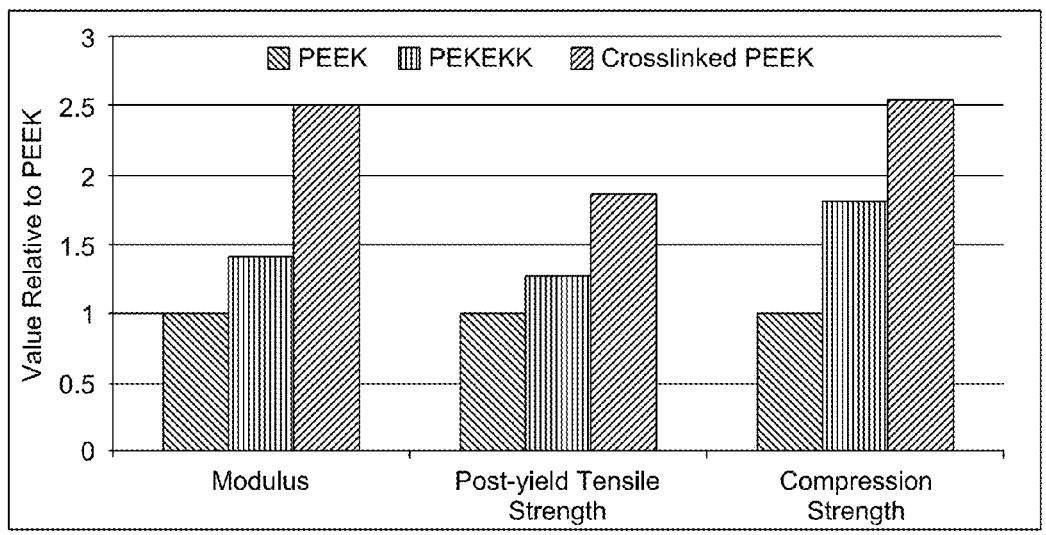
FIG. 9 is a graphical representation of the mechanical properties of PEEK, PEKEKK and cross-linked PEEK samples of Example 3.

Additional tests were run to measure the tensile modulus, post-yield tensile strength and compressive strength of samples of PEKEKK, PEEK and a Crosslinked PEEK as, in Example 1 at an elevated temperature of 200° C. The tensile modulus of samples (measured in GPa) and the post-yield tensile strength at 10% strain (measured in MPa) were evaluated using the procedure as set forth in ASTM D638. Compressive strength was measured in accordance with ASTM D690 (as measured in MPa) was also evaluated at the same temperature. The results appear in Table 3 below and are illustrated in FIG. 9.

TABLE 3

| | Tensile Modulus (GPa) | Post-Yield Tensile Strength at 10% Strain (MPa) | Compressive Strength (MPa) |
| --- | --- | --- | --- |
| PEEK | 0.395 | 23.09 | 47.9 |
| PEKEKK | 0.56 | 29.5 | 86.7 |
| Crosslinked PEEK | 0.99 | 43.2 | 121.9 |

The data demonstrates that at elevated temperatures, the Crosslinked PEEK provided excellent mechanical properties in comparison with the other materials noted that are used in the art.

Figure 10:
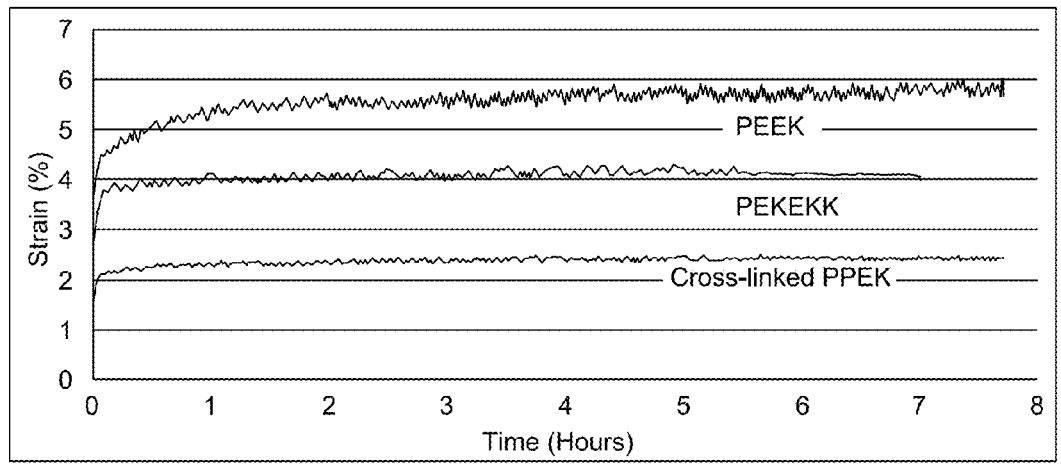
FIG. 10 is a graphical representation of the relationship of strain against time for creep tests run in Example 3.
Figure 11:
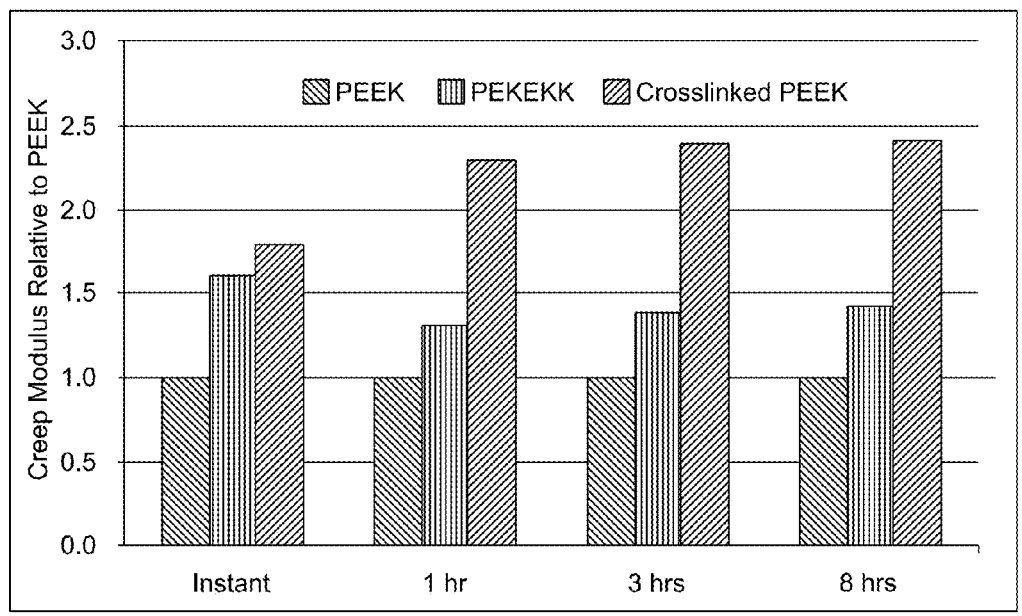
FIG. 11 is a graphical representation in chart form of the Modulus of the samples tested in Example 3 and as set forth in Table 4.

Creep tests were also run on these materials according to ASTM D2990 at 260° C. with a stress of 10 MPa. The creep Modulus at 1, 3 and 7.5 hours is shown in Table 4 and the data is further represented in the graphical relationship of percentage strain v. time as shown in FIG. 10 and the data representation in the chart of FIG. 11. The data show the high modulus under strain which is upheld over time.

TABLE 4

| | Inst. Modulus (MPa) | Modulus at 1 hour (MPa) | Modulus at 3 hours (MPa) | Modulus at 7.5 hours (MPa) |
| --- | --- | --- | --- | --- |
| PEEK | 2.76 | 1.87 | 1.78 | 1.70 |
| PEKEKK | 4.46 | 2.45 | 2.46 | 2.44 |
| Crosslinked PEEK | 4.95 | 4.31 | 4.26 | 4.12 |

Example 4

Figure 12:
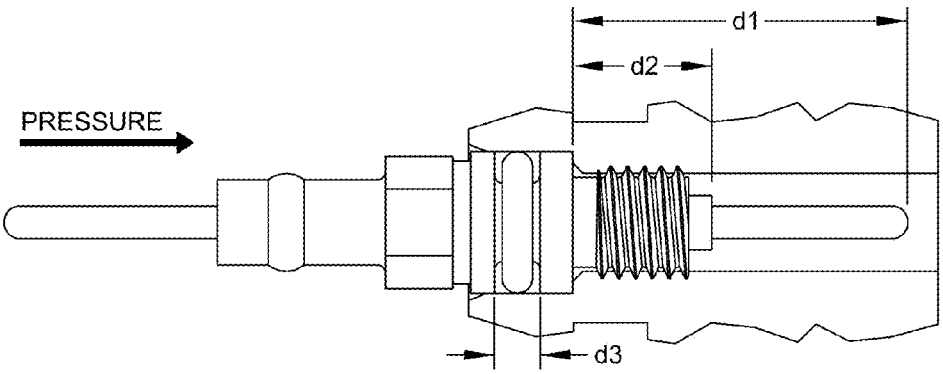
FIG. 12 is a side-elevational view, partially in longitudinal cross-section of a sample connector demonstrating relational distances in the connector for understanding deformation data in Example 4.
Figure 13:
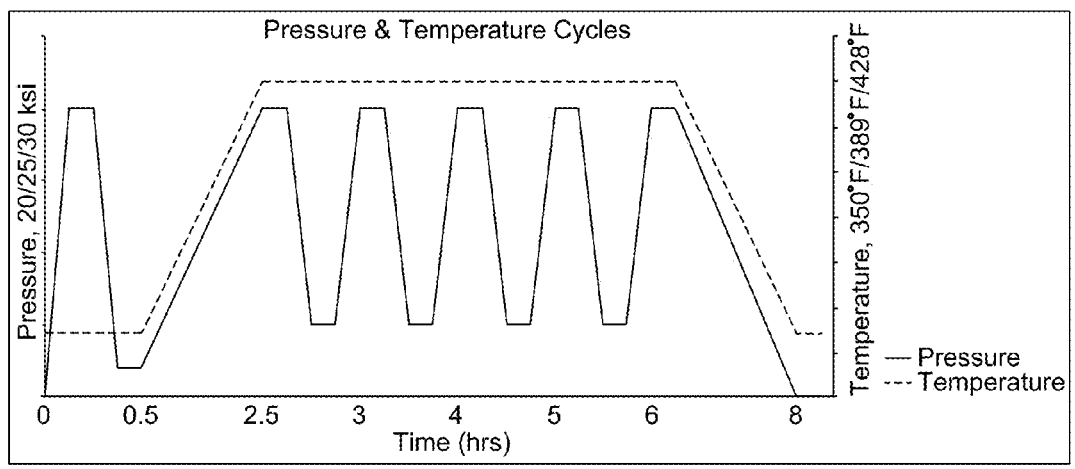
FIG. 13 is a graphical representation of pressure and temperature against time to illustrate the temperature and pressure cycles for testing in Example 4.
Figure 14:
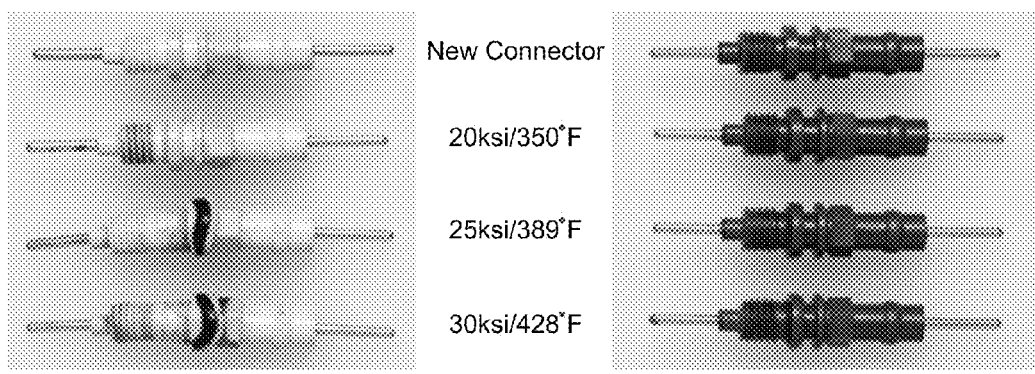
FIG. 14 is a photographic representation of connectors after high temperature and high pressure deformation testing in Example 4.
Figure 15:
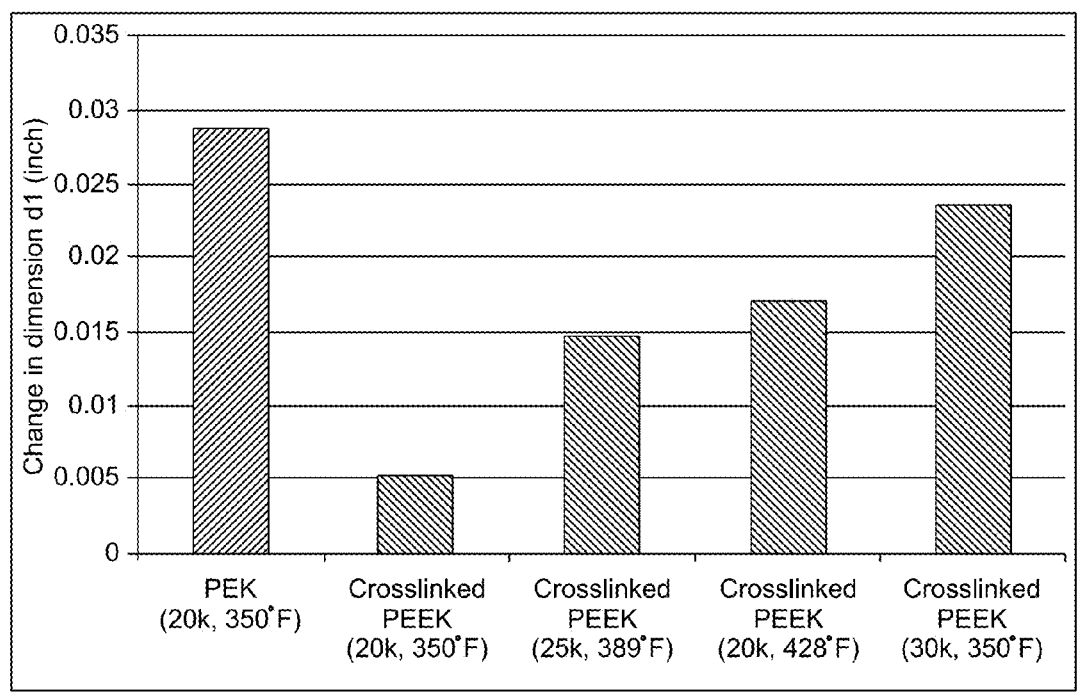
FIG. 15 is a graphical representation of deformation of distance $d_1$ of FIG. 12 measured in the noted samples as tested for deformation in Example 4.

Additional tests were made to sample electrical connectors at high temperature and high pressure conditions using both PEK connectors known in the art, and a cross-linked PEEK connector using materials as described above in Example 3. The sample connectors were measured for deflection and deformation at various measurable distances $d_1$, $d_2$ and $d_3$ along the connectors, wherein such distances are illustrated in a sample connector drawing in FIG. 12. Pressure was applied in the direction of the arrow in FIG. 12 under high temperature and pressure conditions cycled over time as shown in FIG. 13. A photo of the connector samples after cycles at 20 ksi at 350° F., 24 ksi at 389° F. and 30 ksi at 428° F. are shown in FIG. 14. The deformation of the PEK samples (shown on the left side of the photo) in comparison to the structural integrity at high temperature and pressure of the crosslinked PEEK (on the right side of the photo) is evident. FIG. 15 shows the change in dimension $d_1$ measured from the end of the connector to the body portion where the sealing ring is located of a PEK sample at 20 ksi, and in cross-linked PEEK samples at various elevated temperature and pressure conditions. As shown in FIG. 15, at 30 ksi and 350° F., the cross-linked PEEK sample had less deformation than the PEK sample at the same temperature but under even higher pressure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of improving extrusion- and creep-resistance of a component for use in a high temperature sealing element or seal connector, comprising,
   providing a composition comprising an aromatic polymer and a crosslinking compound, and
   subjecting the composition to a heat molding process to form the component and crosslink the aromatic polymer, wherein the crosslinking compound has a structure according to formula (II) below:

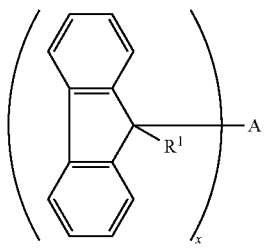 (II)

wherein A is an arene moiety having a molecular weight of less than 10,000 g/mol, $R^1$ is selected from a group consisting of hydroxide (—OH), amine (—$NH_2$), halide, ether, ester, or amide, and x=2.0 to 6.0.

2. The method according to claim 1, wherein the composition is unfilled.

3. The method according to claim 1, wherein the aromatic polymer is selected from the group consisting of a polyarylene polymer, a polysulfone, a polyphenylene sulfide, a polyimide, a polyamide, a polyurea, a polyurethane, a polyththalamide, a polyamide-imide, an aramid, a polybenzimidazole, and blends, copolymers and derivatives thereof.

4. The method according to claim 3, wherein the aromatic polymer is a polyarylene ether polymer including polymer repeating having units of structure according to formula (IV) below:

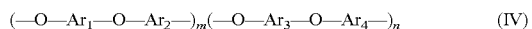
$$(-O-Ar_1-O-Ar_2-)_m(-O-Ar_3-O-Ar_4-)_n \qquad (IV)$$

wherein $Ar_1$, $Ar_2$, $Ar_3$ and $Ar_4$ are identical or different aryl radicals, m is 0 to 1, and n is 1−m.

5. A sealing component formed by the method of claim 1.

6. The sealing component according to claim 5, wherein the composition is unfilled.

7. The sealing component according to claim 5, wherein the sealing component is a seal back-up element, a packer element, a labyrinth seal or a dual-lip sealing component.

8. A sealing connector formed by the method of claim 1.

9. The sealing connector formed by the method of claim 8, wherein the composition is unfilled.

10. A method of improving extrusion- and creep-resistance of a component for use in a high temperature sealing element or seal connector, comprising,
    providing a composition comprising an aromatic polymer and a crosslinking compound, and
    subjecting the composition to a heat molding process to form the component and crosslink the aromatic polymer wherein the crosslinking compound is 9,9'-(biphenyl-4,4'-diyl)bis(9H-fluoren-9-ol) and has a general structure according to formula (V):

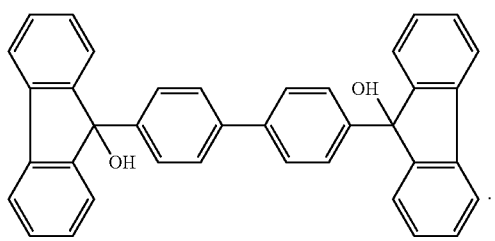 (V)

11. A sealing component formed by the method of claim 10.

12. The sealing component according to claim 11, wherein the composition is unfilled.

13. The sealing component according to claim 11, wherein the sealing component is a seal back-up element, a packer element, a labyrinth seal or a dual-lip sealing component.

14. A sealing connector formed by the method of claim 10.

15. The sealing connector formed by the method of claim 14, wherein the composition is unfilled.

16. A method of improving extrusion- and creep-resistance of a component for use in a high temperature sealing element or seal connector, comprising,
    providing a composition comprising an aromatic polymer and a crosslinking compound, and
    subjecting the composition to a heat molding process to form the component and crosslink the aromatic polymer,
    further comprising a cross-linking reaction additive capable of reacting with the cross-linking compound to form a reactive intermediate in the form of an oligomer, which reactive intermediate oligomer is capable of cross-linking an organic polymer.

17. The method according to claim 16, wherein the cross-linking reaction additive is an organic acid which may be glacial acetic acid, formic acid, and/or benzoic acid.

18. The method according to claim 16, wherein the cross-linking reaction additive may be is an acetate compound that has a structure according to formula (III):

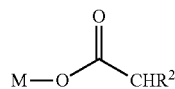 (III)

wherein M is a Group I or a Group II metal; and $R^2$ is an alkyl, aryl, or aralkyl group, wherein the alkyl group is a hydrocarbon group of 1 to about 15 carbon atoms having 0 to about 5 ester or ether groups along or in the chain of the hydrocarbon group, wherein $R^2$ has 0 to about 5 functional groups.

19. A sealing component formed by the method of claim 16.

20. The sealing component according to claim 19, wherein the composition is unfilled.

21. The sealing component according to claim 19, wherein the sealing component is a seal back-up element, a packer element, a labyrinth seal or a dual-lip sealing component.

22. A sealing connector formed by the method of claim 16.

23. The sealing connector formed by the method of claim 22, wherein the composition is unfilled.

* * * * *